(12) United States Patent
Yamazaki et al.

(10) Patent No.: US 7,823,516 B2
(45) Date of Patent: Nov. 2, 2010

(54) TABLE APPARATUS

(75) Inventors: Mitsuru Yamazaki, Ojiya (JP); Toyoshi Kazama, Ojiya (JP); Yusuke Ueki, Ojiya (JP)

(73) Assignee: Nippon Bearing Co., Ltd., Ojiya-shi (JP)

( * ) Notice: Subject to any disclaimer, the term of this patent is extended or adjusted under 35 U.S.C. 154(b) by 847 days.

(21) Appl. No.: 11/531,763

(22) Filed: Sep. 14, 2006

(65) Prior Publication Data

US 2007/0119347 A1    May 31, 2007

(30) Foreign Application Priority Data

Nov. 29, 2005    (JP)    ............... 2005-344238

(51) Int. Cl.
*A47B 85/00* (2006.01)
(52) U.S. Cl. ........................................ 108/20
(58) Field of Classification Search ............... 108/20, 108/143, 21, 22; 248/424, 429, 298.1; 74/490.09, 74/490.13, 490.08
See application file for complete search history.

(56) References Cited

U.S. PATENT DOCUMENTS

| 3,495,519 | A | * | 2/1970 | Bluitt et al. ................. 108/137 |
| 4,896,869 | A | | 1/1990 | Takekoshi |
| 5,036,723 | A | * | 8/1991 | Matsumoto ............. 74/490.08 |
| 5,163,651 | A | * | 11/1992 | Matsumoto ................. 248/425 |
| 5,292,211 | A | * | 3/1994 | Takei .......................... 408/91 |
| 5,373,751 | A | * | 12/1994 | Katahira ................... 74/89.32 |
| 5,481,936 | A | * | 1/1996 | Yanagisawa ............. 74/490.08 |
| 5,499,552 | A | * | 3/1996 | Yanagisawa ........... 74/471 XY |
| 5,613,403 | A | * | 3/1997 | Takei ...................... 74/490.09 |
| 5,724,893 | A | * | 3/1998 | Lee et al. ...................... 108/20 |
| 6,186,024 | B1 | * | 2/2001 | Leiber ..................... 74/490.09 |

(Continued)

FOREIGN PATENT DOCUMENTS

EP    0 017 144 A1    10/1980

(Continued)

OTHER PUBLICATIONS

Translated JP 10-034463: JP10-034463—Claims, Means, Technical Field, Drawings, Detailed Description, Effect of the Invention, Technical Problem, Description of Drawings, and Prior Art.*

(Continued)

*Primary Examiner*—Darnell M Jayne
*Assistant Examiner*—Andres Gallego
(74) *Attorney, Agent, or Firm*—Connolly Bove Lodge & Hutz LLP

(57) ABSTRACT

A very practical table apparatus is provided that can be made smaller and thinner without the need to stack a first table that moves in a first direction and a second table that moves in a second direction as in prior art. The table apparatus has a table (1) on which work is disposed, a first actuator (4) for moving the table (1) in the first direction a, and a second actuator (7) that is disposed on substantially the same plane as the first actuator, and that moves the table (1) in the second direction b, thereby allowing a single table (1) to be moved in the first direction a and second direction b without the need to stack two tables.

2 Claims, 2 Drawing Sheets

U.S. PATENT DOCUMENTS

| | | | |
|---|---|---|---|
| 6,196,138 B1 * | 3/2001 | Sakai et al. | 108/22 |
| 6,327,929 B1 * | 12/2001 | Yanagisawa | 74/490.09 |
| 2004/0187743 A1 * | 9/2004 | Kanehira | 108/20 |

FOREIGN PATENT DOCUMENTS

| | | | |
|---|---|---|---|
| GB | 2 188 263 A | | 9/1987 |
| JP | 61-230829 | | 10/1986 |
| JP | 10034463 A | * | 2/1998 |
| JP | 10034464 A | * | 2/1998 |
| JP | 10-034463 | | 10/1998 |

OTHER PUBLICATIONS

European Search Report issued Mar. 13, 2007.

* cited by examiner

TABLE APPARATUS

TECHNICAL FIELD

The present invention relates to a table apparatus.

BACKGROUND ART

A conventional table apparatus is disclosed in Japanese Lain-open Patent Application No. 10-34463 (Patent Document 1) by the present applicant.

The table apparatus disclosed in Patent Document 1 is configured so that a first table that moves in a first direction and a second table that moves in a second direction are moved by using a first actuator (first ball screw) and a second actuator (second ball screw) which are each disposed on the same plane, thereby allowing a table to be moved in the first and second directions by simply stacking the first and second tables without the need to stack the first and second actuators.

Patent Document 1

Japanese Laid-open Patent Application No. 10-34463

DISCLOSURE OF THE INVENTION

The present invention was perfected as a result of thoroughgoing research to reduce the thickness and size of the table apparatus disclosed in the above-described Patent Document 1, and an object thereof is to provide a very practical table apparatus that can move as a single table in a first direction and a second direction without the need to stack two tables.

The main point of the present invention is described below with respect to the attached diagrams.

The present invention relates to a table apparatus having a table 1 on which work is mounted, and comprises a table 1 that moves in a first direction a and a second direction b; a first actuator 4 that comprises an immovable unit 2 and a translation unit 3 driven in a translational movement with respect to the immovable unit 2, and that is used to move the table 1 in the first direction a; a second actuator 7 that has an immovable unit 5 disposed parallel to the translation direction or on the same straight line as the translation direction of the translation unit 3 of the first actuator 4, as well as a translation unit 6 driven in a translational movement with respect to the immovable unit 5, that is disposed on substantially the same plane as the first actuator 4, and that moves the table 1 in the second direction b; first sliding means 8 that is disposed next to the translation unit 3 of the first actuator 4 and that slides the table 1 in the first direction a; second sliding means 9 that is disposed next to the first sliding means 8 and that slides the table 1 in the second direction b; and third sliding means 10 having a sliding means 10a disposed next to the translation unit 6 of the second actuator 7, and having sliding means 10b that is disposed at a prescribed angle $\theta_1$ to the translation direction of the translation unit 6 of the second actuator 7 in the table 1 and that produces sliding action in combination with the sliding means 10a.

According to a second aspect of the invention, in the table apparatus according to the first aspect of the invention, fourth sliding means is disposed for guiding the translational motion of the translation unit of the second actuator.

According to a third aspect of the invention, in the table apparatus according to the first or second aspect of the invention, the prescribed angle $\theta_1$ is set at 45°.

The present invention configured in the manner described above is a very practical table apparatus that allows the configuration to be made thinner and smaller.

BEST MODES FOR CARRYING OUT THE INVENTION

Figure 1:
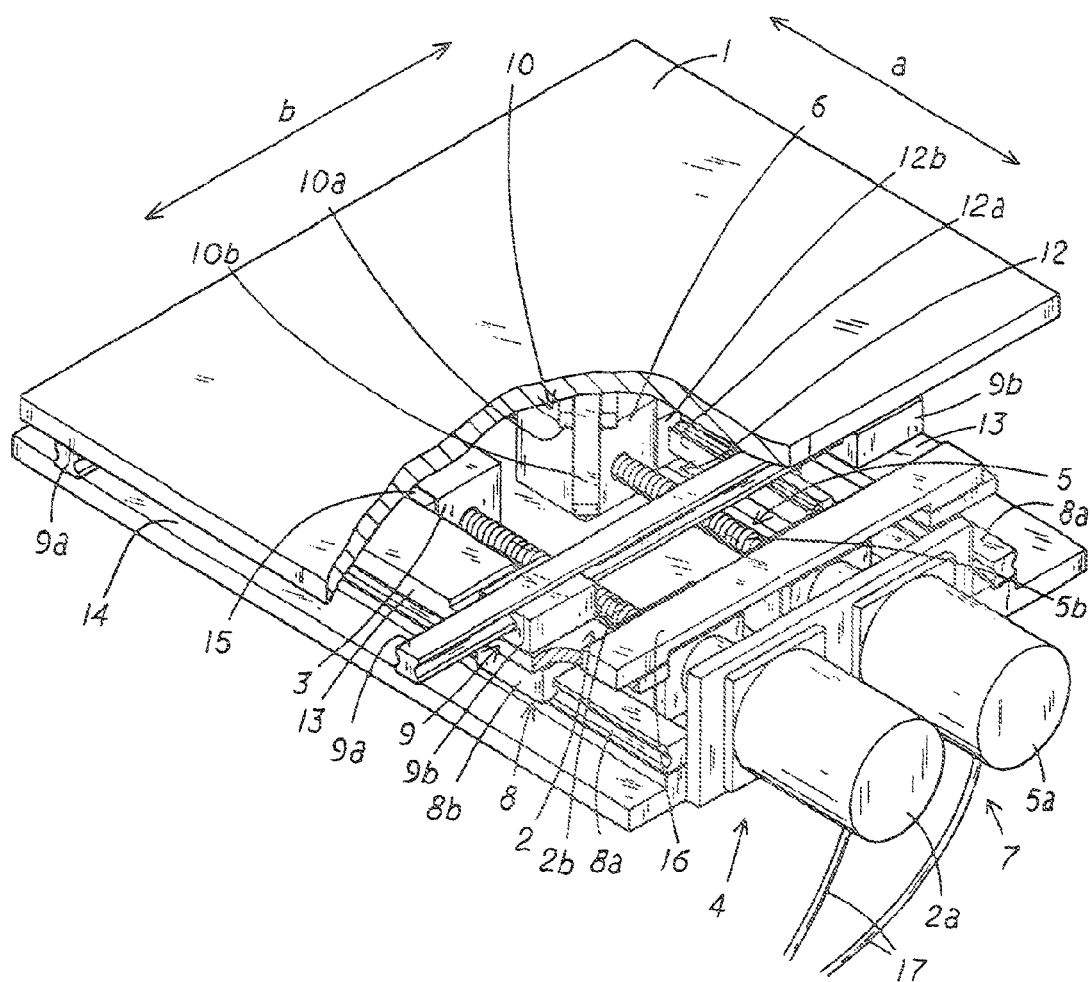
FIG. 1 is a schematic perspective view with a portion of the present example cut away.

The best mode for carrying out the invention is briefly described below with reference to the diagrams to describe the effects of the present invention.

A table 1 can be moved in a first direction a via first sliding means 8 by the translational motion of a translation unit 3 of a first actuator 4, and the table 1 can be moved in a second direction b via second sliding means 9 and third sliding means 10 by the translational motion of a translation unit 6 of a second actuator 7. A single table 1 can therefore be moved in the first direction a and the second direction b, and since a first table for moving in a first direction and a second table for moving in a second direction do not need to be stacked in the conventional manner, the apparatus can be made thinner and smaller.

EXAMPLES

Specific examples of the present invention are described below with respect to the diagrams.

The present example is a table apparatus provided with a table 1 on which work is mounted, and comprises a table 1 that moves in a first direction a and a second direction b; a first actuator 4 that comprises an immovable unit 2 and a translation unit 3 driven in a translational movement with respect to the immovable unit 2, and that is used to move the table 1 in the first direction a; a second actuator 7 that has an immovable unit 5 disposed parallel to the translation direction or on the same straight line as the translation direction of the translation unit 3 of the first actuator 4, as well as a translation unit 6 driven in a translational movement with respect to the immovable unit 5, that is disposed on substantially the same plane as the first actuator 41 and that moves the table 1 in the second direction b; first sliding means 8 that is disposed next to the translation unit 3 of the first actuator 4 and that slides the table 1 in the first direction a; second sliding means 9 that is disposed next to the first sliding means 8 and that slides the table 1 in the second direction b; and third sliding means 10 having sliding means 10a disposed next to the translation unit 6 of the second actuator 7, and having sliding means 10b that is disposed at a prescribed angle $\theta_1$ to the translation direction of the translation unit 6 of the second actuator 7 in the table 1 and that produces sliding action in combination with the sliding means 10a.

Following is a detailed description of each component.

The table 1 is a plate-like body in which a suitable steel member is formed in a rectangular shape as viewed from above, as shown in FIG. 1. The table 1 is disposed on the upper surface of a mounting stand 14, which is a plate-like body in which a suitable steel member is formed in a rectangular shape as viewed from above in the same manner as the table 1.

First guide rails 8a are disposed in the front and rear end portions, respectively, of the upper surface of the mounting stand 14, and two first guide bodies 8b are fitted onto the first guide rails 8a. The first sliding means 8 is composed of the first guide rails 8a and first guide bodies 8b. The two first guide bodies 8b fitted onto the first guide rails 8a are disposed on the lower surface of respective connecting members 13. The connecting members 13 are connected to each other by way of a connecting member 16.

Second guide rails 9a are disposed on the right and left end portions, respectively, of the lower surface of the table 1, and two second guide bodies 9b are fitted onto the second guide rails 9a. The second sliding means 9 is composed of the second guide rails 9a and second guide bodies 9b. The two second guide bodies 9b fitted onto the second guide rails 9a are disposed on the upper surface of the respective connecting members 13.

In other words, the first guide bodies 8b and second guide bodies 9b are stacked and connected by way of the connecting members 13, and a total of eight guide bodies 8b and 9b are configured so as to integrally slide.

The first guide rails 8a and the second guide rails 9a are orthogonally disposed.

The table 1 therefore moves in the first direction a by sliding the first guide bodies 8b and the table 1 moves in the second direction b by sliding the second guide bodies 9b.

The first actuator 4 and second actuator 7 are disposed on the mounting stand 14 in parallel (parallel to the translation direction of the translation unit 3 of the first actuator 4) with the first guide rails 8a. Specifically, the first actuator 4 and second actuator 7 are disposed on the same plane. The configuration may also be one in which the second actuator 7 is disposed facing the first actuator 4 on the same straight line as the translation direction of the translation unit 3 of the first actuator 4.

The first actuator 4 has a threaded shaft 2b as the immovable unit 2 rotatable by a motor 2a that can rotate in the forward and reverse directions and that is disposed substantially in the center area of the mounting stand 14. The actuator further has a nut member as the translation unit 3 for threadably meshing with the threaded shaft 2b and moving in the axial direction of the threaded shaft 2b via the rotation of the threaded shaft 2b. The translation unit 3 is connected via a connecting member body 15 to the connecting member 13 that is connected to one of the first guide bodies 8b fitted onto one of the first guide rails 8a. The table 1 is therefore moved in the first direction a by moving the translation unit 3 of the first actuator.

The second actuator 7 has a threaded shaft 5b as the immovable unit 5 rotatable by a motor 5a that can rotate in the forward and reverse directions, and a nut member as the translation unit 6 for threadably meshing with the threaded shaft 5b and moving in the axial direction of the threaded shaft 5b via the rotation of the threaded shaft 5b. A third guide body 10a acting as third sliding means 10a is fastened to the upper surface of the translation unit 6 at a prescribed angle $\theta_1$ with respect to the translation direction of the translation unit 6.

The third guide body 10a is disposed on the lower surface of the table 1 and is fitted onto a third guide rail 10b as third sliding means 10b disposed at a prescribed angle $\theta_1$ with respect to the translation direction of the translation unit 6. In the present example, the prescribed angle $\theta_1$ is set at 45°.

Figure 2:
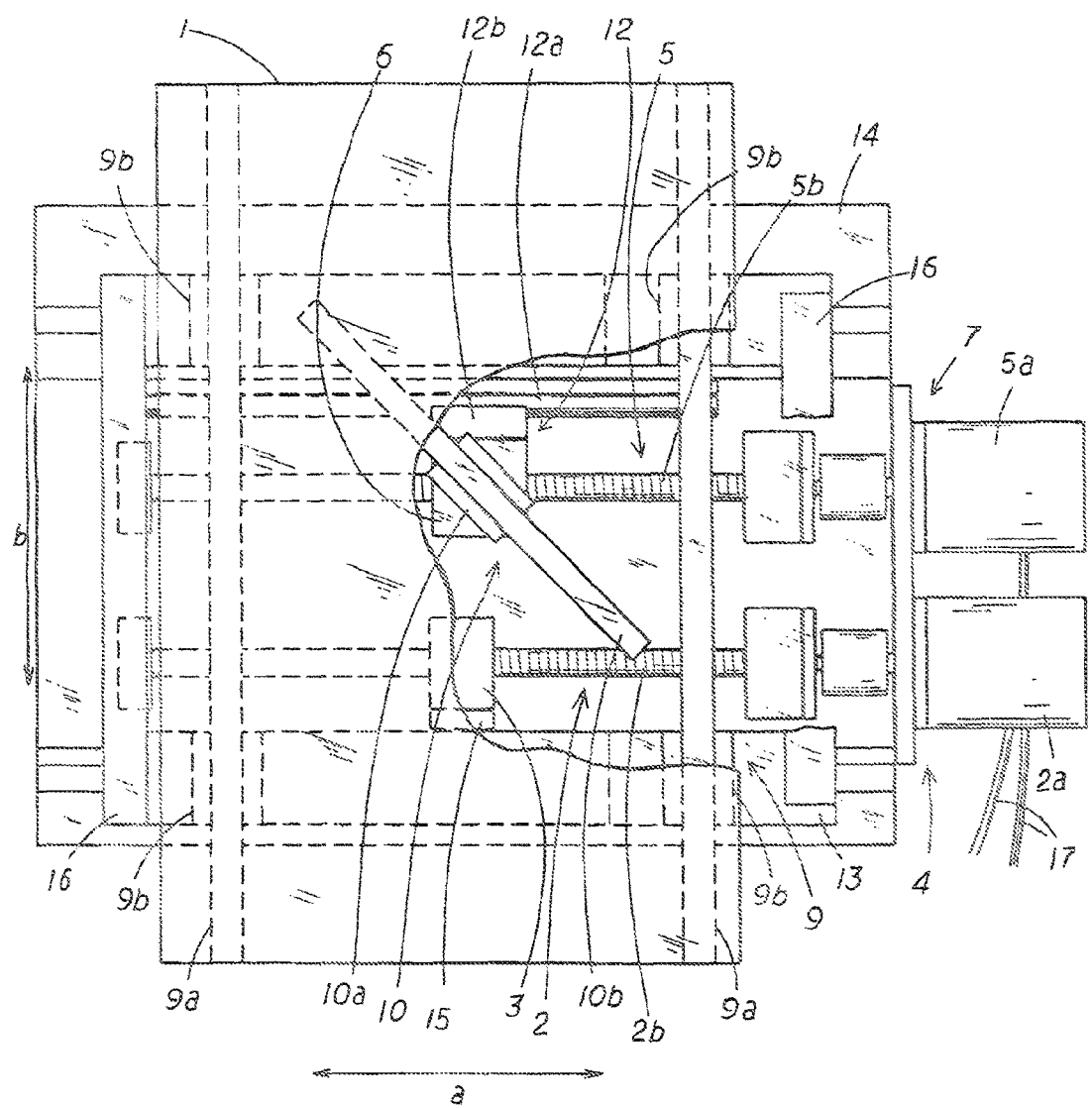
FIG. 2 is a schematic perspective view with a portion of the present example cut away.

Therefore, when the translation unit 6 of the second actuator 7 is moved to the left in FIG. 2, the table 1 is guided by the second guide rails 9a and the third guide rail 10b, and is moved in the lower side direction of FIG. 2, which is the second direction b. Conversely, when the translation unit 6 is moved to the right in FIG. 2, the table is guided by the second guide rails 9a and the third guide rail 10b, and is moved in the upper side direction of FIG. 2.

In the present example, the third guide rail 10b is set at a 45° angle $\theta_1$ to the translation direction of the translation unit 6, as described above. The amount of movement of the table 1 in the second direction b increases with increased angle $\theta_1$ (as the angle approaches 90°), and the amount of movement of the table 1 in the second direction b decreases with reduced angle $\theta_1$ (as the angle approaches 0°), but a large force of movement is obtained. Therefore, the angle $\theta_1$ is not limited to 45°, but when the angle is set to 45°, an average amount and force of movement can be obtained.

The reference numeral 17 in the diagrams indicates cords that are connected to each of the motors 2a and 5a.

In the present example, fourth sliding means 12 is disposed for guiding the translation of the translation unit 6 of the second actuator 7. Specifically, the fourth sliding means 12 is composed of a fourth guide rail 12a that is disposed on the inner side of one of the first guide rails 8a, and a fourth guide body 12b (with a shape in which the aperture faces inward) that is disposed on the translation unit 6 of the second actuator 7 and fitted onto the fourth guide rail 12a.

The movement of the translation unit 6 of the second actuator 7 is therefore guided by the fourth sliding means 12, the load that operates on the immovable unit 5 of the second actuator 7 is reduced when the translation unit 6 is caused to perform a translational motion and the table 1 is moved in the second direction b by using the third guide rail 10b, and the immovable unit 5 is prevented from bending.

With the present example configured in this manner, the first actuator 4 and second actuator 7 are disposed on the same plane, and the table can be moved in the first direction a and second direction b without the need to stack two tables. Therefore, in comparison with Patent Document 1, the configuration can be made thinner and smaller, the load placed on the singularly layered first and second actuators is reduced, the table apparatus is given better responsiveness and driving characteristics at higher speeds, the structure is simplified, and costs are reduced.

Also, fourth sliding means 12 is provided, and the immovable unit 5 can be prevented from bending even if the translation unit 6 of the second actuator 7 is caused to perform a translational motion, and the table 1 can be moved and controlled with greater precision.

Since the guide bodies are connected, a lightweight structure with excellent rigidity can be obtained, and the table 1 can be moved and controlled with high precision on the basis of this aspect as well.

The present example is, therefore, a very practical table apparatus that can be made smaller and thinner.

The invention claimed is:

1. A table apparatus having a table on which work is disposed, said apparatus comprising:
   a single table that moves in a first direction (a) and a second direction (b);
   a first actuator that comprises a first immovable unit and a first translation unit driven in a translational movement with respect to the first immovable unit, and that is used to move the single table in the first direction (a);
   a second actuator that has a second immovable unit disposed parallel to the translation direction or on the same straight line as the translation direction of the first translation unit of the first actuator, as well as a second translation unit driven in a translational movement with respect to the second immovable unit, that is disposed on substantially the same plane as the first actuator, and that moves the single table in the second direction (b);
   first sliding means that is disposed next to the first translation unit of said first actuator and that slides the single table in the first direction (a);

second sliding means that is disposed next to the first sliding means and that slides the single table in the second direction (b);

third sliding means that is disposed next to the second translation unit of said second actuator, and being disposed at a prescribed angle ($\theta_1$) to the translation direction of the second translation unit of said second actuator and that produces sliding action in combination with said second sliding means; and fourth sliding means that is disposed for guiding the translational motion of the second translation unit of said second actuator, wherein the second sliding means comprise a guide rail attached directly to the lower surface of the single table.

2. The table apparatus according to claim 1, wherein said prescribed angle ($\theta_1$) is set at 45°.

* * * * *